(12) United States Patent
Rowley (10) Patent No.: US 7,689,584 B2
(45) Date of Patent: Mar. 30, 2010

(54) HYBRID GROUPS

(75) Inventor: Peter Andrew Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 233 days.

(21) Appl. No.: 11/606,713

(22) Filed: Nov. 29, 2006

(65) Prior Publication Data

US 2008/0126309 A1 May 29, 2008

(51) Int. Cl.
*G06F 17/30* (2006.01)
(52) U.S. Cl. ...................................... 707/102
(58) Field of Classification Search ............... 707/1–10, 707/100–102
See application file for complete search history.

(56) References Cited

U.S. PATENT DOCUMENTS

| | | | |
|---|---|---|---|
| 6,768,988 B2 * | 7/2004 | Boreham et al. | 707/3 |
| 6,785,686 B2 | 8/2004 | Boreham et al. | |
| 7,016,893 B2 | 3/2006 | Boreham et al. | |
| 7,016,907 B2 | 3/2006 | Boreham et al. | |
| 7,020,662 B2 | 3/2006 | Boreham et al. | |
| 7,130,839 B2 * | 10/2006 | Boreham et al. | 707/3 |
| 2005/0021498 A1 * | 1/2005 | Boreham et al. | 707/1 |
| 2005/0273516 A1 * | 12/2005 | Patrick et al. | 709/238 |
| 2005/0273518 A1 * | 12/2005 | Patrick et al. | 709/238 |
| 2006/0036463 A1 * | 2/2006 | Patrick et al. | 705/1 |
| 2006/0195575 A1 * | 8/2006 | Delany et al. | 709/225 |
| 2008/0077462 A1 * | 3/2008 | Patel et al. | 705/7 |
| 2008/0126355 A1 * | 5/2008 | Rowley | 707/10 |
| 2008/0208807 A1 * | 8/2008 | Rowley | 707/3 |
| 2008/0208809 A1 * | 8/2008 | Rowley | 707/3 |

* cited by examiner

*Primary Examiner*—Diane Mizrahi
(74) *Attorney, Agent, or Firm*—Blakely, Sokoloff, Taylor & Zafman LLP (57) ABSTRACT

A method and apparatus for managing groups in a directory server is described. In one embodiment, in response to a request for accessing a static group, an action represented by an attribute of an entry of the directory server is dynamically performed. A result of the action is returned as part of a response of the static group.

20 Claims, 10 Drawing Sheets

600

LDIF fragment to create group branch under root 602
dn: ou=groups,dc=example,dc=com
objectclass:organizationalunit
ou: groups
description: groups branch create the hrpeople entry dn: cn=hrpeople,dc=groups,dc=example,dc=com
objectclass: groupofnames
cn: hrpeople
description: HR group
604
add the group members all of which are
assumed to exist under people
member: cn=john doe,ou=people,dc=example,dc=com
member: cn=jane doe,ou=people,dc=example,dc=com
...

MANUAL ENTRY
OF EACH MEMBER

LDIF fragment to create group branch under root

602 dn: ou=groups,dc=example,dc=com
objectclass:organizationalunit
ou: groups
description: groups branch create the hrpeople entry dn: cn=hrpeople,dc=groups,dc=example,dc=com
objectclass: groupofnames
cn: hrpeople
description: HR group

604 add the group members all of which are
assumed to exist under people
member: cn=john doe,ou=people,dc=example,dc=com
member: cn=jane doe,ou=people,dc=example,dc=com
...

MANUAL ENTRY
OF EACH MEMBER

LDIF fragment to create group branch under root dn: ou=groups,dc=example,dc=com
objectclass:organizationalunit
ou: groups
description: groups branch create the hrpeople entry dn: cn=hrpeople,dc=groups,dc=example,dc=com
objectclass: groupofnames
cn: hrpeople
description: HR group
provide search criteria or filter for people working the in HR group
...

804

SEARCH CRITERIA

HYBRID GROUPS

TECHNICAL FIELD

Embodiments of the present invention relate to a Lightweight Directory Access Protocol (LDAP), and more specifically to hybrid groups.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

Entries may be part of a group, for example, a static group. The static group is one which where membership is specified by presence in a list. Thus, a static group may comprises a list of members. The specific members are listed and identified by their attribute. Membership may change at any time, just as one might cross a name off the paper list or write in a new name. Such a potentially large static group may be either prone to error or not always up to date.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing groups in a directory server. In one embodiment, in response to a request for accessing a static group, the directory server dynamically performs an action represented by an attribute of an entry of the directory server. A result of the action is returned as part of a response of the static group.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
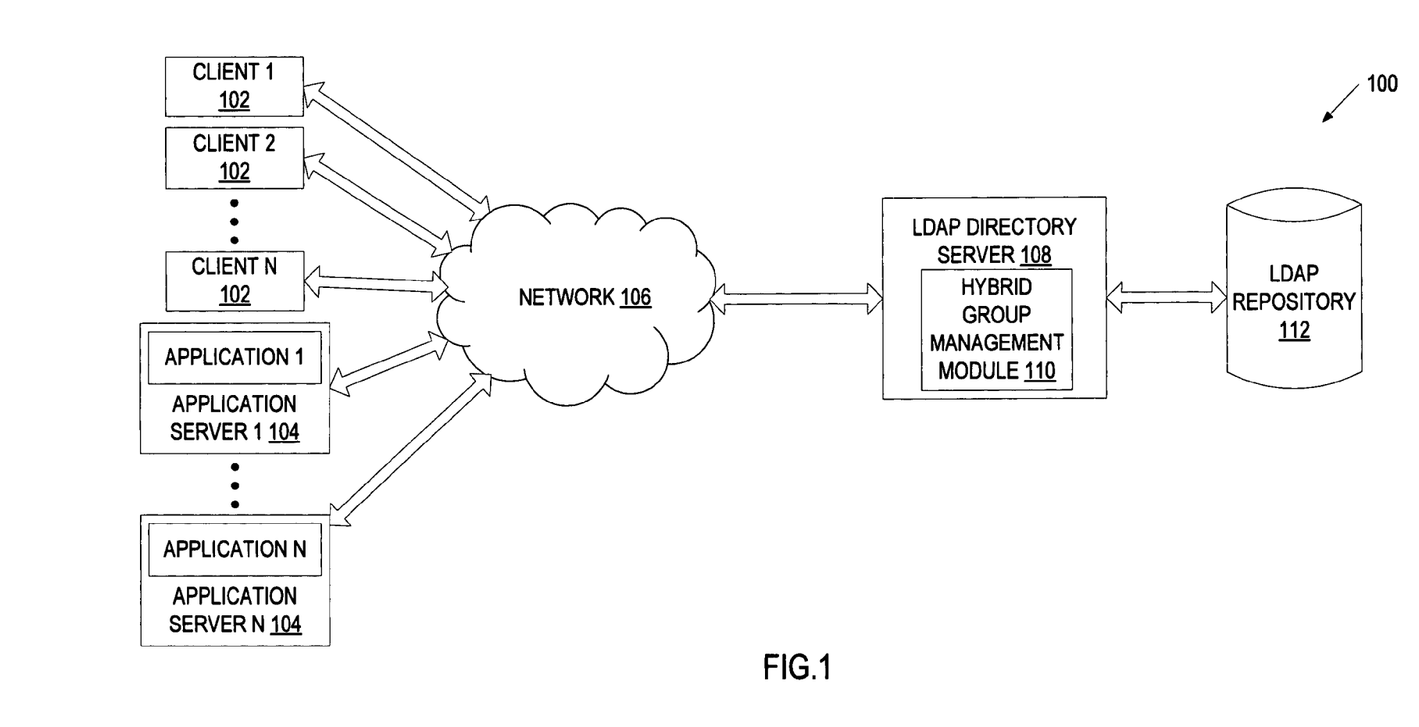
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information pertaining either to a static or a dynamic group. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 1 12 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 includes a hybrid group management module 110 that may be part of the LDAP directory server 108 or some other device and/or program, or be an independent module implemented in hardware, software or a combination thereof.

In one embodiment, the hybrid group management module 110 manages groups formed in the LDAP directory server 108. Groups are typically defined based on certain common characteristics of members of the groups. A member can be included in a group if the member has an attribute of a specific type. Conventionally, groups can be static or dynamic. In accordance with one embodiment, the hybrid group management module 110 manages static groups as dynamic groups and dynamic groups as dynamic groups.

A static group is one where membership is specified by presence in a list. For example, a static group may comprise a list of members. The specific members are listed and identified by their attribute. The operation and management of a static group is further described in FIGS. 5 and 6.

A dynamic group is one where membership is inherent in some property of the entries. For example, a group containing a number of persons in an organization may be "everyone who works in the HR department". This would be defined by a filter (query) against the directory for "department=HR". As people are hired, laid-off, or transferred in the company, they may become part of the HR department group. The operation and management of a dynamic group is further described in FIGS. 7 and 8. One key feature of dynamic groups is that they require less explicit maintenance. On the other hand, a static group that is intended to contain everyone in the HR department would need to be maintained, either manually or by a script. Such a potentially large static group may be either prone to error or not always up to date. There are also implementation efficiency issues relating to static versus dynamic groups. Thus, in a dynamic group, instead of looking at a group attribute to verify if a user possesses the group attribute, membership is determined by checking a user attribute, which can be specified arbitrarily.

In accordance with one embodiment, the hybrid group management module 110 may receive a request pertaining to either a static group or a dynamic group. The hybrid group management module 110 processes the request accordingly and returns a result corresponding to the type of group the request is pertaining to. Thus, the hybrid group management module 110 may virtualize a group (e.g. Static group) by maintaining only one group (e.g. A dynamic group). If a request is pertaining to a static group, the hybrid group management module 110 may generate a response of the static group. If the request is pertaining to a dynamic group, the hybrid group management module 110 may generate a response of the dynamic group. This process is farther described with respect to FIGS. 2, 3, and 4.

Figure 2:
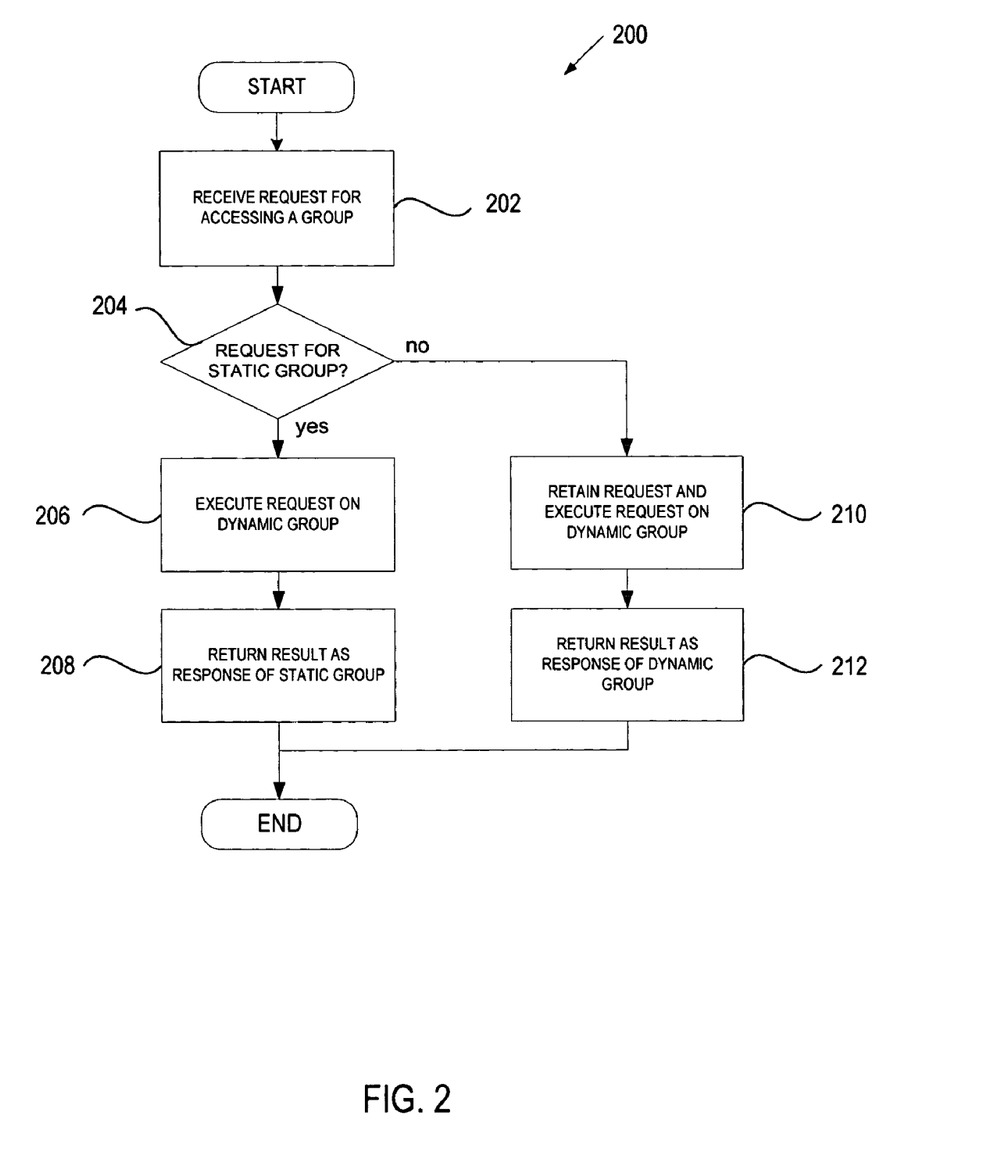
FIG. 2 illustrates a flow diagram of one embodiment of a method for processing a request for accessing a group in a directory server.

FIG. 2 illustrates a flow diagram of one embodiment of a method for processing a request for accessing a group in a directory server. The method may be performed by processing logic that may comprise hardware (e.g., circuitry, dedicated logic, programmable logic, microcode, etc.), software (such as instructions run on a processing device), or a combination thereof. In one embodiment, method 200 is performed by the hybrid group management module 110 of the LDAP directory server 108 of FIG. 1.

Referring back to FIG. 2, at block 202, a processing logic of the LDAP directory server 108 receives a request for accessing a group in the LDAP repository 112. The request may be an action to be performed on the group, such as a query, a change, an addition, a deletion, among others. At 204, the hybrid group management module 110 identifies whether the request pertains to a static group.

At block 206, processing logic executes the request on a dynamic group corresponding to the static group. The value of an attribute in the entries in the LDAP repository 112 is used to enumerate the members of the static group. In accordance with one embodiment, the attribute may comprise a "memberof" attribute. For example, an entry of an employee of a company working in the HR department may have an attribute of "memberof=HRpeople".

Processing logic dynamically changes the content of a group based on the value of the "memberof" attribute of an entry in the LDAP directory server 108. In accordance with one embodiment, the content of the group may comprise a membership. The content of the group may be dynamically changed by first determining that the value of the attribute of the entry corresponds to the group and second adding an identifier (e.g., a DN) of the entry to the content of the group. For example, an entry for an employee of a company may include the following attribute: "memberof=HRpeople". The processing logic determines whether the value of the attribute ("HRpeople") corresponds to a group. Assuming the group called "HRpeople" already exists in the LDAP directory server 108, the employee with the above attribute is thus added as a member of the "HRpeople" group in the LDAP directory server. Thus, the content of the "HRpeople" group may be dynamically changed and updated based on the attributes of the entries of the employees of the company. Furthermore, the content of the group may be dynamically changed such that the entry does not have to be manually added to the group.

In accordance with one embodiment, all static groups are in reality dynamic groups based on the "memberof" attribute. Whenever the static group is enumerated, a search is performed in the background to enumerate the members in the member virtual attribute. When an entry is added or removed, the target entry "memberof" attribute is modified instead of changing the member attribute as it is conventionally performed for members in a static group.

At block 208, processing logic returns the results of the above execution at block 206, as a response of the static group. The execution on a dynamic group is transparent to a client or a user.

At block 210, when a request pertains to a dynamic group, processing logic retains the request pertaining to the dynamic group and executes the request on the dynamic group maintained in the LDAP repository 112 using the "memberof" attribute.

At block 212, processing logic returns the results of the above execution at block 210, as a response of the dynamic group.

Figure 3:
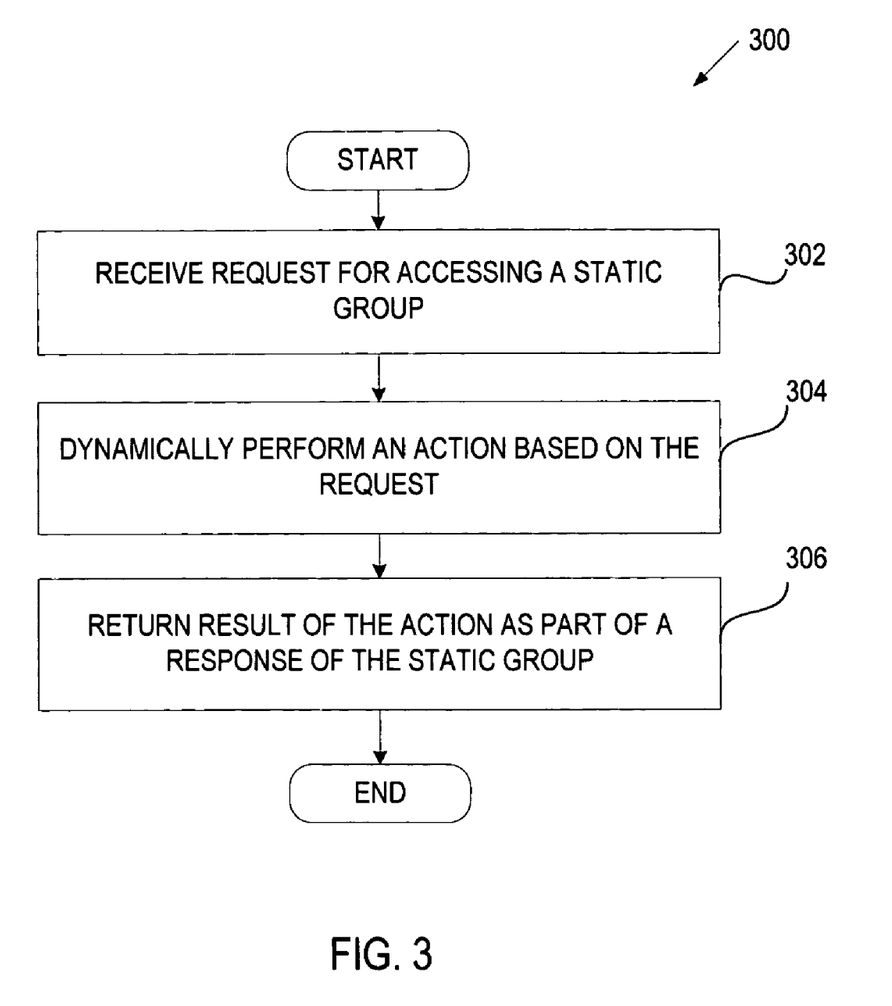
FIG. 3 illustrates a flow diagram of one embodiment of a method for processing a request for accessing a static group in a directory server.

FIG. 3 illustrates a flow diagram of one embodiment of a method for processing a request for accessing a static group in a directory server. At 302, processing logic receives a request for accessing a static group of LDAP repository 112. LDAP repository 112 manages groups where dynamic groups are seamlessly virtualized as static groups. At 304, processing logic performs an action based on the request. The action is represented by an attribute of an entry in the LDAP repository 112. In accordance with one embodiment, the attribute may include a "memberof" attribute. A search is performed in the background to enumerate the members of the static group. The action based on the request is then performed on one or more of the enumerated members at 304. At 306, processing logic returns the results of the action as part of a response of the static group. The dynamic group appears as a static group to a user.

Figure 4:
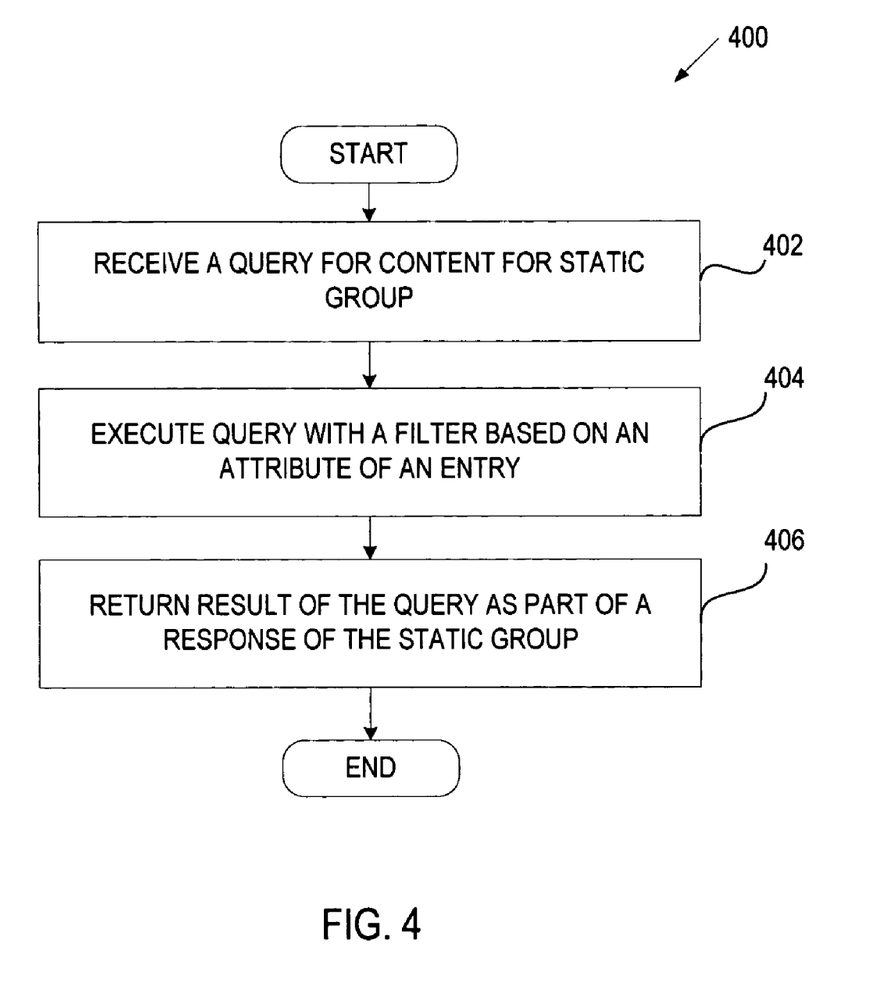
FIG. 4 illustrates a flow diagram of one embodiment of a method for processing a query pertaining to a static group in a directory server.

FIG. 4 illustrates a flow diagram of another embodiment of a method for processing a query pertaining to a static group in a directory server. Processing logic receives a query for the content of a static group at block 402. At block 404, processing logic executes the query with a filter based on the "memberof" attribute to enumerate the members of the static groups. At block 406, processing logic returns the results of the query, e.g. members of the static group, as part of a response of the static group.

Figure 5:
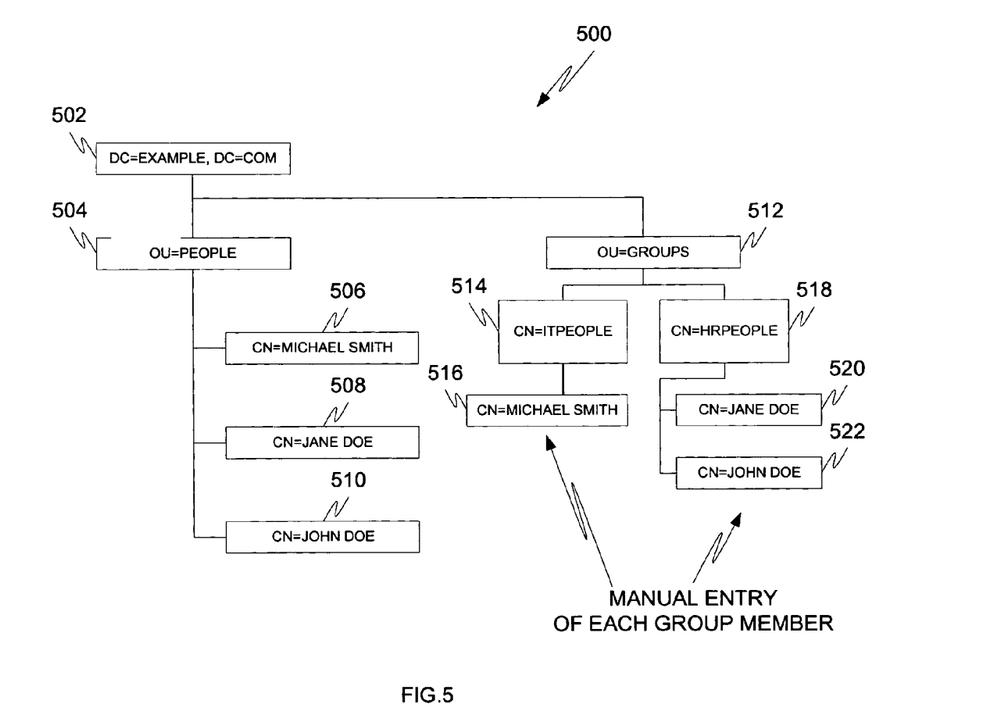
FIG. 5 illustrates a block diagram of a conventional static group of a directory server.

FIG. 5 illustrates a block diagram of a conventional static group of an LDAP directory server. The distributed directory tree 500 includes a root entry 502 where a company named "Example.com" has a root entry of "dc=example, dc=com". The root entry 502 has a first node 504, and a second node 512. The first node 502 and second node 502 include entries for the organization unit (ou). For example, the first node 502 defines an organization unit subtree for employees in the company (ou=people). Entries 506, 508, 510 correspond to the individual employees working in the company. Each entry includes a Relative Distinguished Name (RDN) such as cn=michael smith in entry 506. The second node 512 defines an organization unit subtree for groups in the company (ou=groups).

The groups may be composed of IT group 514 and HR group 518. The content of each group can be populated and maintained by manually entering the group members for the respective group. The content of each group includes members that are assumed to exist in the company (under "ou=people" branch 504). For example, the IT group 514 may comprise employee Michael Smith 516. The HR group 518 may comprise employees Jane Doe 520, and John Doe 522. The content of the group are manually entered and thus manually updated.

Figure 6:
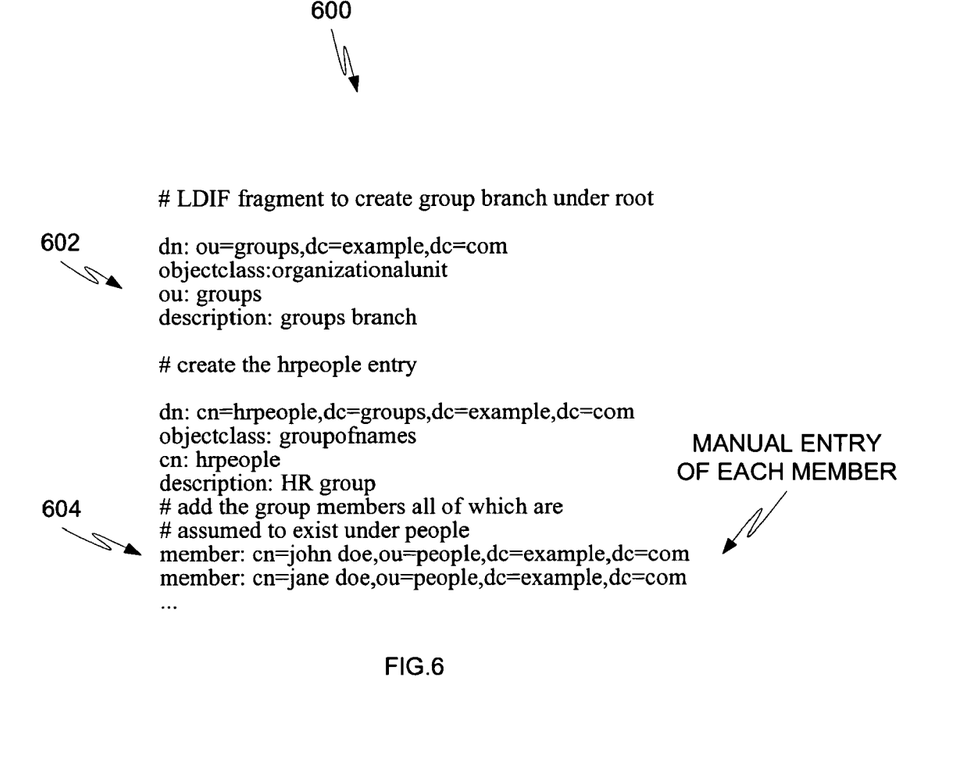
FIG. 6 illustrates an example of an entry of the static group of FIG. 5.

FIG. 6 illustrates an example of an LDIF fragment 600 that shows building a static group called "hrpeople" who could be given privileges to access confidential employee documents such as employment agreements, salary, etc. The individual group member entries 604 are manually entered and are assumed to already exist in the directory under "ou=people" branch. This configuration creates a separate branch called "groups" 602 under which is placed the "hrpeople" group. FIG. 6 is based on the graphical illustration of the organization "example.com" previously illustrated in FIG. 5.

Figure 7:
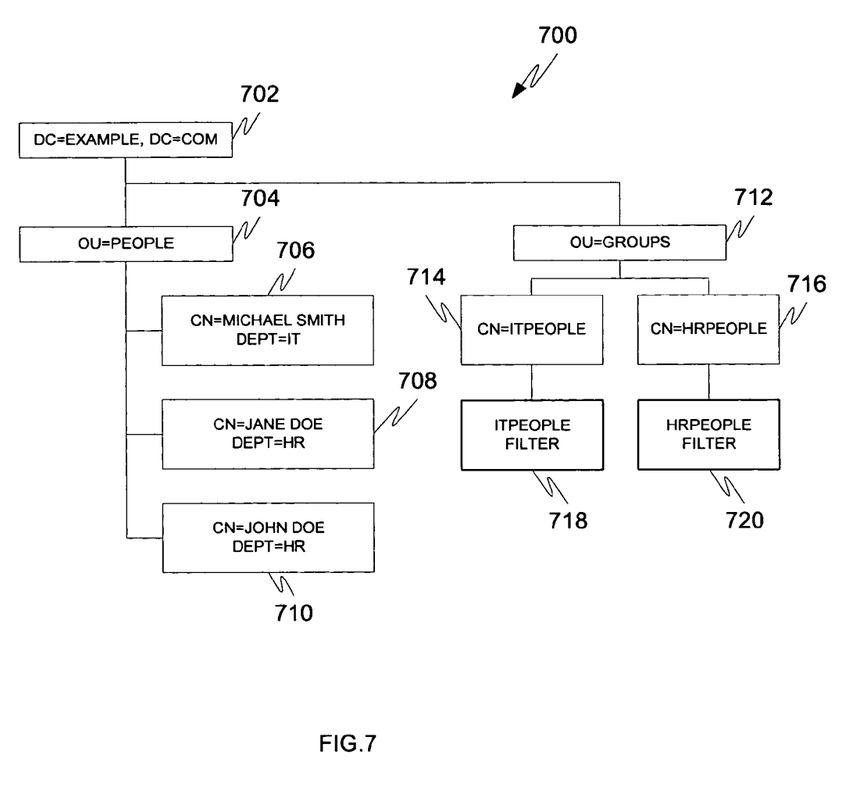
FIG. 7 illustrates a block diagram of a conventional dynamic group of a directory server.

FIG. 7 illustrates a block diagram of a dynamic group of a directory server in accordance with one embodiment. The distributed directory tree 700 includes a root entry 702 where a company named "Example.com" has a root entry of "dc=example, dc=com". The root entry 702 has a first node 704, and a second node 712. The first node 702 and second node 702 include entries for the organization unit (ou). For example, the first node 702 defines an organization unit subtree for employees in the company (ou=people). Entries 706, 708, 710 correspond to the individual employees working in the company. Each entry includes a Relative Distinguished Name (RDN) such as cn=michael smith in entry 706. The second node 712 defines an organization unit subtree for groups in the company (ou=groups).

The groups may be composed of IT group 714 and HR group 718. The content of each group can be populated and maintained dynamically using filters 718, 720 for the respective groups 714, 718. The content of each dynamic group may include members resulting from search using the filters. For example, the IT group 714 may include an ITpeople filter 718 that searches for employees under the node "ou=people" 704 that have an attribute corresponding to an IT department. For example, the dynamic group may include employee Michael Smith 706. Similarly, the HR group 716 may include an HRpeople filter 720 that searches for employees under the node "ou=people" 704 that have an attribute corresponding to an HR department. For example, the dynamic group may include employees Jane Doe 708, and John Doe 710. The content of the dynamic group is automatically updated.

Figure 8:
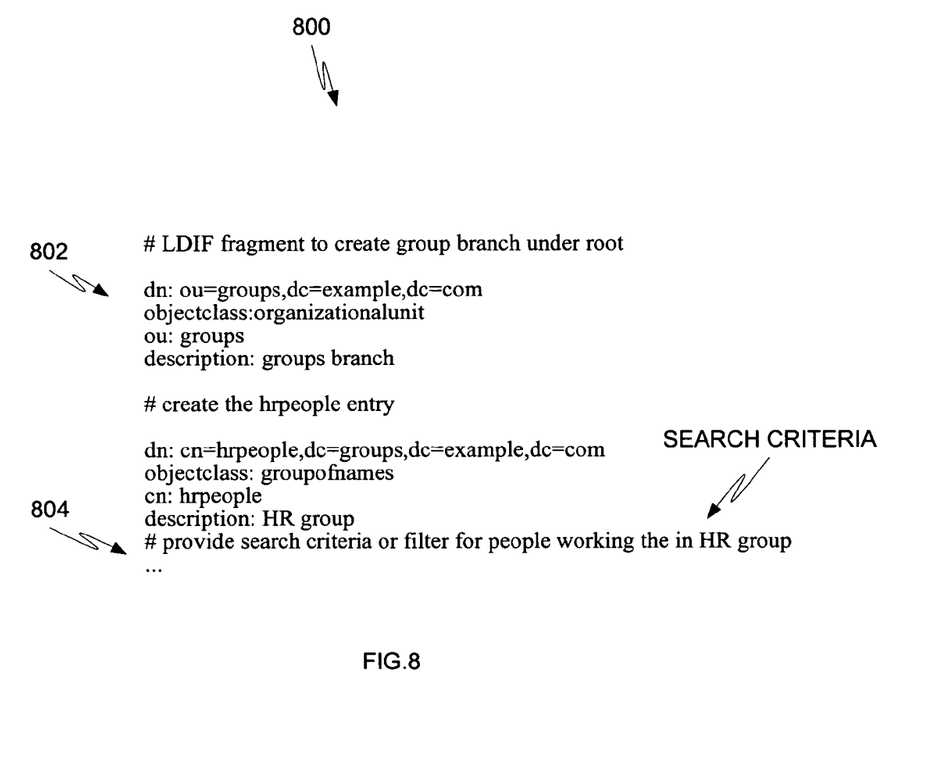
FIG. 8 illustrates an example of an entry of the dynamic group of FIG. 7.

FIG. 8 illustrates an example of an LDIF fragment 800 that shows building a dynamic group called "hrpeople" who could be given privileges to access confidential employee documents such as employment agreements, salary, etc. The group members are defined by a search filter 804 performed on the entries in the directory under "ou=people" branch. This configuration creates a separate branch called "groups" 702 under which is placed the "hrpeople" group 716. FIG. 8 is based on the graphical illustration of the organization "example.com" previously illustrated in FIG. 7.

Figure 9:
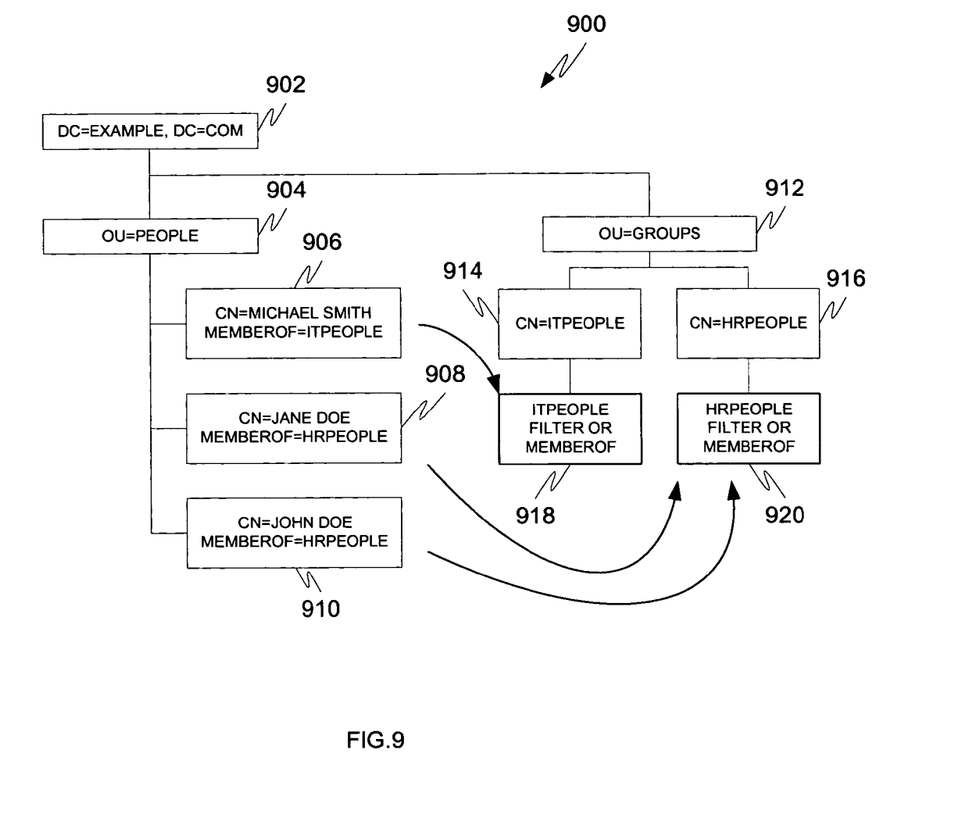
FIG. 9 illustrates a block diagram of a hybrid group of a directory server in accordance with one embodiment.

FIG. 9 illustrates a block diagram of a hybrid group of a directory server in accordance with one embodiment. The hybrid group management module 110 receives a request pertaining to either a static or a dynamic group. The hybrid group management module 110 further dynamically maintains dynamic groups 912 and renders the dynamic groups 912 as virtual static groups when the request pertains to a static group.

When the request pertains to a static group, the attribute "memberof" may be used to enumerate members of the static group. Subsequently, the hybrid group management module 110 may perform an action on the enumerated members. The hybrid group management module 110 may then return results of the action as part of a response of the static group.

When the request pertains to a dynamic group, the filters may be used to generate members of the dynamic group. Subsequently, the hybrid group management module 110 may perform an action on the generated members. The hybrid group management module 110 may then return results of the action as part of a response of the dynamic group.

In accordance with one embodiment, the content of each group 918 and 920 may be dynamically populated and maintained based on the value of the "memberof" attribute in the employee entries 906, 908, 910. The content of each group includes members that are based on the value of the "memberof" attribute in the employee entries 906, 908, 910. For example, a query for the content of the IT group 916 may return employee Michael Smith 906. A query for the content of the HR group 916 may return employees Jane Doe 908, and John Doe 910. Thus, the content of the groups maybe dynamically changed based on the value of the "memberof" attribute in the entries under "ou=people" 904.

In accordance with another embodiment, when the value of the attribute "memberof" in an entry corresponds to a non-existing group under "ou=groups" 906, a new group is automatically created under "ou=groups" 912 having an identifier or a common name based on the new value of the attribute "memberof" of the entry. In one embodiment, when a new group is created, the new group is a static group.

In accordance with one embodiment, groups under "ou=groups" 706 may include a static group and/or a dynamic group. For a static group, once the "memberof" attribute of an entry is updated, the static group's membership is automatically (and explicitly) modified to include a new member or delete an old member. For a dynamic group, a filter is modified or edited to retrieve all entries with the "memberof" attribute equal to the ID of the dynamic group. Subsequently, when a request for a list of members of the dynamic group is received, the filter is used to generate a list of members of this dynamic group.

Figure 10:
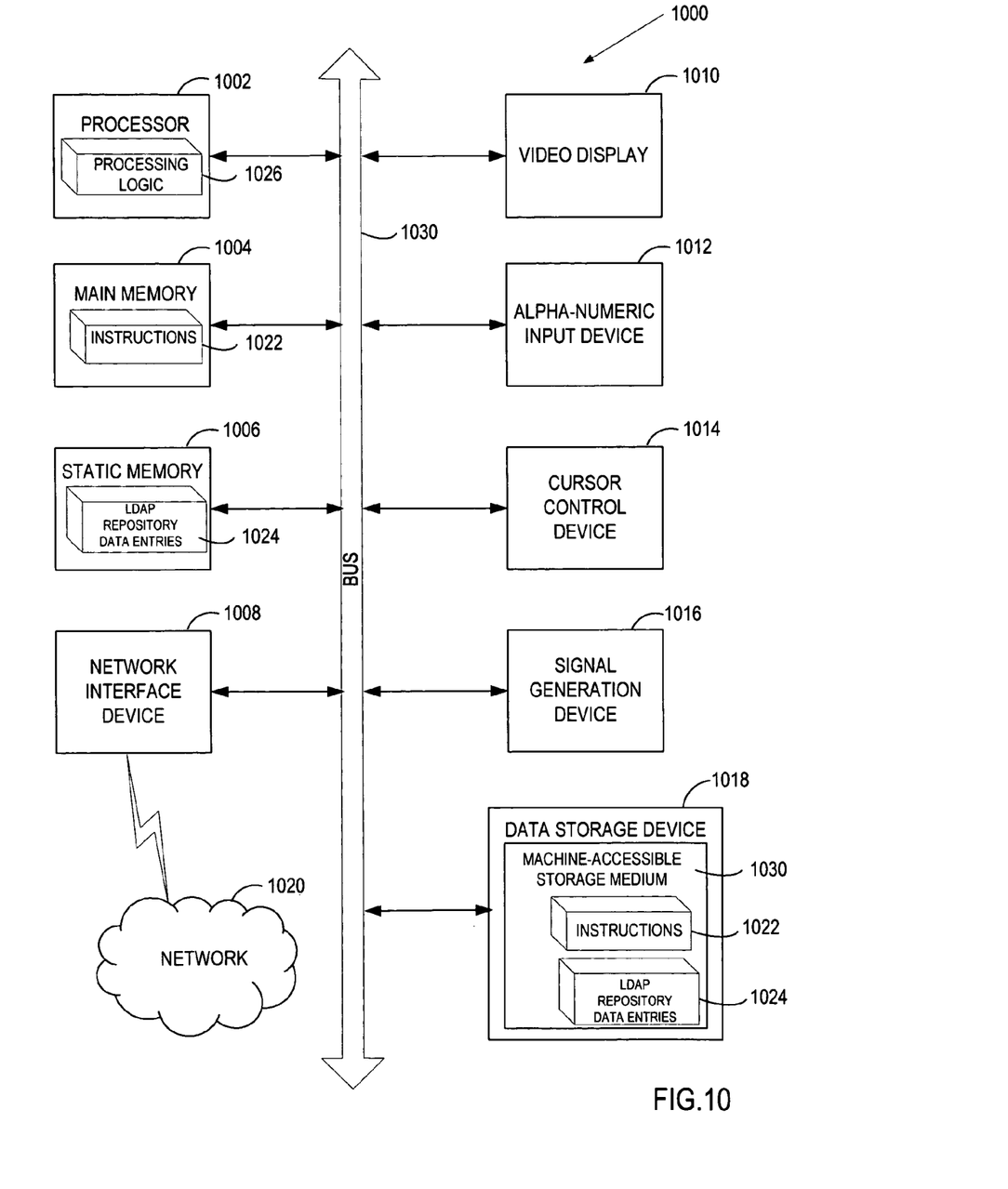
FIG. 10 illustrates a block diagram of an exemplary computer system.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1030 on which is stored one or more sets of instructions (e.g., software 1022) embodying any one or more of the methodologies or functions described herein. The software 1022 may also reside, completely or at least partially, within the main memory 1004 and/or within the processing device 1002 during execution thereof by the computer system 1000, the main memory 1004 and the processing device 1002 also constituting machine-accessible storage media. The software 1022 may further be transmitted or received over a network 1020 via the network interface device 1008.

The machine-accessible storage medium 1030 may also be used to store LDAP repository data entries 1024. LDAP repository data entries 1024 may also be stored in other sections of computer system 1000, such as static memory 1006.

While the machine-accessible storage medium 1030 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for dynamically managing hybrid groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a lightweight directory access protocol (LDAP) directory server machine that performs directory queries on an LDAP repository, a request to perform an action on a static group, wherein the static group is one of a plurality of static groups and dynamic groups maintained by the LDAP directory server machine as dynamic groups;
   in response to the request to access the static group, dynamically performing, by the LDAP directory server machine, the requested action on a dynamic group that corresponds to the static group by utilizing a membership attribute of entries of the LDAP directory server machine to enumerate members of the static group; and
   returning, by the LDAP directory server machine, a result of the action as part of a response corresponding to the static group.

2. The method of claim 1 wherein the request for accessing the static group comprising a query of content of the static group.

3. The method of claim 1 wherein dynamically performing the action comprises executing a query with a filter on the directory server, the filter comprising the value of the membership attribute of the entry.

4. The method of claim 1 wherein returning the result of the action comprises returning the result of a query with a filter on the directory server, the filter comprising the value of the membership attribute of the entry.

5. The method of claim 1 wherein the membership attribute comprises a "memberof" attribute.

6. The method of claim 1 wherein the LDAP repository is part of the LDAP directory server machine.

7. The method of claim 1 wherein the dynamic group that corresponds to the static group includes a filter comprising the value of the membership attribute of the entry.

8. A lightweight directory access protocol (LDAP) directory server machine comprising:
   an LDAP repository; and
   a hybrid group management module coupled to the LDAP repository, the hybrid group management module configured to:
   receive a request to perform an action on a static group, wherein the static group is one of a plurality of static groups and dynamic groups maintained by the LDAP directory server machine as dynamic groups;
   dynamically perform, in response to the request to access the group, the requested action on a dynamic group that corresponds to the static group by utilizing a membership attribute of entries of the LDAP directory server machine to enumerate members of the static group; and
   return a result of the action as part of a response corresponding to the static group.

9. The directory server of claim 8 wherein the request for accessing the static group comprises a query of content of the static group.

10. The directory server of claim 8 wherein the action comprises an execution of a query with a filter on the LDAP directory server, the filter comprising the value of the membership attribute of the entry.

11. The directory server of claim 8 wherein the result of the action comprises the result of a query with a filter on the LDAP directory server, the filter comprising the value of the membership attribute of the entry.

12. The directory server of claim 8 wherein the membership attribute comprises a "memberof" attribute.

13. The directory server of claim 8 wherein the dynamic group that corresponds to the static group includes a filter comprising the value of the membership attribute of the entry.

14. A computer-accessible storage medium including data that, when accessed by a computer system, cause the computer system to perform a method comprising:
   receiving a request to perform an action on a static group, wherein the static group is one of a plurality of static groups and dynamic groups maintained by a lightweight directory access protocol (LDAP) directory server as dynamic groups;
   in response to the request to access the static group, dynamically performing the requested action on a dynamic group that corresponds to the static group by utilizing a membership attribute of entries of the LDAP directory server to enumerate members of the static group; and
   returning a result of the action as part of a response corresponding to the static group.

15. The computer-accessible storage medium of claim 14 wherein the request for accessing the static group comprising a query of content of the static group.

16. The computer-accessible storage medium of claim 14 wherein dynamically performing the action comprises executing a query with a filter on the directory server, the filter comprising the value of the membership attribute of the entry.

17. The computer-accessible storage medium of claim 14 wherein returning the result of the action comprises returning the result of a query with a filter on the directory server, the filter comprising the value of the membership attribute of the entry.

18. The computer-accessible storage medium of claim 14 wherein the membership attribute comprises a "memberof" attribute.

19. The computer-accessible storage medium of claim 14 wherein the LDAP repository is part of the LDAP directory server machine.

20. The computer-accessible storage medium of claim 14 wherein the dynamic group that corresponds to the static group includes a filter comprising the value of the membership attribute of the entry.

* * * * *